No. 760,057. PATENTED MAY 17, 1904.
A. H. COWLES.
PROCESS OF ELECTRICALLY SMELTING MATERIALS.
APPLICATION FILED OCT. 20, 1903.
NO MODEL.
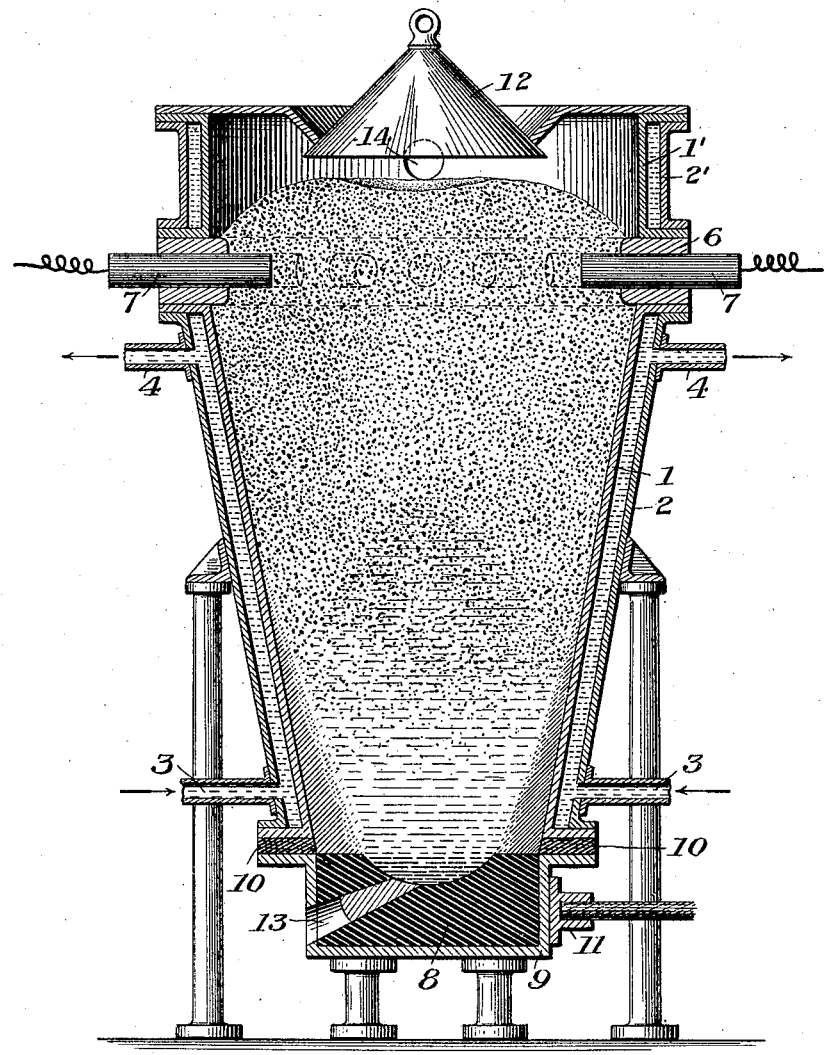
Witnesses:
R A Balderson.
Julia B. Hill.
Inventor:
Alfred H. Cowles,
by Byrnes & Townsend,
Att'ys.

No. 760,057. Patented May 17, 1904.

UNITED STATES PATENT OFFICE.

ALFRED H. COWLES, OF CLEVELAND, OHIO.

PROCESS OF ELECTRICALLY SMELTING MATERIALS.

SPECIFICATION forming part of Letters Patent No. 760,057, dated May 17, 1904.

Application filed October 20, 1903. Serial No. 177,763. (No specimens.)

*To all whom it may concern:*

Be it known that I, ALFRED H. COWLES, a citizen of the United States, residing at Cleveland, in the county of Cuyahoga and State of Ohio, have invented certain new and useful Improvements in Processes of Electrically Smelting Materials, of which the following is a specification.

This process is especially intended for smelting materials whose conductivity increases as their temperature rises—for example, the mixture of finely-divided lime and carbon employed for the production of calcium carbid. According to the process the material is charged into an electric furnace having a casing of electrically-conductive material, the charge is electrically heated to the required temperature, and those portions of the charge adjacent to the inner face of the furnace-casing are cooled to an extent sufficient to prevent any substantial shunting of the electric current through the casing. The heating is preferably effected by employing the charge or the product thereof, or both, as the resistance-conductor and increasing the density of the electric current along the path of the current through this conductor. The charge may thus be gradually heated to the required temperature, and the product may be brought into a molten condition, permitting it to be tapped out of the furnace. The cooling of those portions of the charge adjacent to the casing is preferably effected by flowing water along the outer face of the casing from the hotter to the cooler portions of the furnace.

The process may be carried out by the use of furnaces of various forms. A stack-furnace is shown in the accompanying drawing, in which the figure is a vertical axial section.

The furnace shown has a casing or shell of iron 1, the major portion of which is in the form of a downwardly-converging bosh surrounded by a water-jacket 2. Pipes 3 serve for the introduction of water into the lower end of the jacket, and it thence flows upwardly along the outer surface of the casing and escapes through the pipes 4 above. The upper portion 1' of the stack has a similar water-jacket 2'. Between the upper portion of the stack and the bosh is interposed a ring 6, of refractory non-conducting material, such as magnesia fire-brick, through which extend a number of horizontal radial electrodes 7 of the same polarity, shown as cylindrical carbon rods. The lower end of the stack is closed by a hearth 8, of solid carbon, held in an iron casing 9, which is separated from the stack-casing 1 by a layer 10 of refractory insulation. One terminal 11 of the source of electric current is secured to the hearth-casing 9, the hearth thus serving as one electrode. A bell and hopper charging mechanism 12 is supported upon the upper end of the furnace. A tap-hole 13 for the molten product extends through the hearth, and a lateral flue 14 for the waste gases leads from the upper end of the stack. In employing this furnace to carry out the process the charge—for example, the usual mixture of ground lime and coke for the production of calcium carbid—is fed into the furnace until it covers the ends of the upper electrodes 7. An electric current is then passed between the upper electrodes and the hearth-electrode, the current being carried in the first instance by one or more narrow cores of broken coke or carbon rods extending from the upper electrodes to the hearth, this being the means usually employed to pass an electric current through a charge of high resistance. The heat developed in the cores or rods soon raises the surrounding portions of the charge to a temperature which causes the charge to thereafter serve as the resistance-conductor. In the furnace shown the cross-section of the chamber diminishes from the upper to the lower end, thereby increasing the density of the electric current downwardly through the charge and increasing the heat developed therein along the path of the current. The charge may thus be readily heated to a temperature sufficient to effect the production of calcium carbid and to bring the carbid into a molten condition, enabling it to be removed through the tap-hole 13.

In the foregoing description of the process it has been assumed that the current flowing between the upper electrodes and the hearth would pass simply through the charge and the resulting carbid, and that it would not shunt through the iron casing 1 of the furnace, although this offers a path of higher conductivity than the heated charge and carbid. It has also been assumed that this iron casing would resist the heat of the charge. In fact, however, without further precautions the major or a considerable portion of the current would be diverted from the charge through the iron casing, and this casing would soon be melted and destroyed. No insulating material is known which would effectively protect the iron casing from the action of a charge of lime and carbon at the temperature requisite for the production of calcium carbid. No protecting-lining for the iron casing 1 of the bosh has therefore been shown or described. I have found that the iron casing may be sufficiently insulated from the charge and carbid product and that it may be at the same time protected from the intensely hot contents of the furnace by introducing a number of streams of cold water into the jacket 2 through the pipes 3 at its lower end and flowing the water upward along the outer face of the casing to the outlet-pipes 4. The temperature of those portions of the charge or carbid lining in contact with the iron casing 1 is by this means easily reduced to such a point that a substantially non-conducting sheath is maintained between the hot charge and molten carbid and the casing as long as a constant flow of water is kept up through the jacket. This sheath, which serves as an insulating-lining for the casing, consists toward the upper part of the furnace of the unreduced mixture of lime and carbon, but changes toward the hearth, at least in part, into a solid or pasty mass of carbid when the furnace contains a pool of molten carbid.

The linings heretofore used in electric furnaces have been expensive and perishable and introduce impurities into the product. No permanent lining which would enable calcium carbid to be produced in a furnace of the type described has yet been suggested.

My process enables a simple water-jacketed iron shell to be used as a furnace-wall and prevents any substantial diversion of the heating-current from the charge through the wall.

I claim—

1. The process of smelting reducible materials which are normally poor conductors of electricity but whose conductivity increases with their temperature, which consists in supporting a solid charge of the material and a reducing agent in an electric furnace having a casing of electrically-conductive material, electrically heating the solid charge to the required temperature, and cooling those portions of the charge adjacent to the inner face of the furnace-casing to an extent sufficient to prevent any substantial shunting of the electric current through the casing, as set forth.

2. The process of smelting reducible materials which are normally poor conductors of electricity but whose conductivity increases with their temperature, which consists in supporting a solid charge of the material and a reducing agent in an electric furnace having a casing of electrically-conductive material, electrically heating the solid charge to the required temperature and bringing the product into a molten condition, cooling those portions of the charge adjacent to the inner face of the furnace-casing to an extent sufficient to prevent any substantial shunting of the electric current through the casing, and withdrawing the product and supplying additional materials as required, as set forth.

3. The process of smelting reducible materials which are normally poor conductors of electricity but whose conductivity increases with their temperature, which consists in supporting a solid charge of the material and a reducing agent in an electric furnace having a casing of electrically-conductive material, passing an electric current through the solid charge or product thereof, acting as a resistance-conductor, and thereby heating the charge to the required temperature, and decreasing the conductivity of those portions of the charge adjacent to the inner face of the furnace-casing, to protect the casing and prevent the current from shunting through it, by applying a cooling medium to the outer face of said casing, as set forth.

4. The process of smelting reducible materials which are normally poor conductors of electricity but whose conductivity increases with their temperature, which consists in supporting a solid charge of the material and a reducing agent in an electric furnace having a casing of electrically-conductive material, passing an electric current through the solid charge or product thereof, acting as a resistance-conductor, and thereby heating the charge to the required temperature, and decreasing the conductivity of those portions of the charge adjacent to the inner face of the furnace-casing, to protect the casing and prevent the current from shunting through it, by flowing a cooling medium along the outer face of said casing from the hotter to the cooler portions of the furnace, as set forth.

5. The process of smelting reducible materials which are normally poor conductors of electricity, but whose conductivity increases with their temperature, which consists in supporting a solid charge of the material and a reducing agent in an electric furnace having a casing of electrically-conductive material, passing through the solid charge or product thereof an electric current the density of which increases along the path of the current, thereby heating the charge to the required temperature and bringing the product into a molten condition, and decreasing the conductivity of those portions of the charge adjacent to the inner face of the furnace-casing to protect the casing and prevent the current from shunting through it by applying a cooling medium to the outer face of said casing, as set forth.

6. The process of smelting reducible materials which are normally poor conductors of electricity but whose conductivity increases with their temperature, which consists in supporting a solid charge of the material and a reducing agent in an electric furnace having a casing of electrically-conductive material, passing through the solid charge or product thereof an electric current the density of which increases along the path of the current, thereby heating the charge to the required temperature and bringing the product into a molten condition, decreasing the conductivity of those portions of the charge adjacent to the inner face of the furnace-casing to protect the casing and prevent the current from shunting through it by applying a cooling medium to the outer face of said casing, and withdrawing the product and supplying additional materials as required, as set forth.

7. The process of smelting reducible materials which are normally poor conductors of electricity but whose conductivity increases with their temperature, which consists in supporting a solid charge of the material and a reducing agent in an electric furnace having a casing of electrically-conductive material, passing through the solid charge or product thereof an electric current the density of which increases along the path of the current, thereby heating the charge to the required temperature and bringing the product into a molten condition, and decreasing the conductivity of those portions of the charge adjacent to the inner face of the furnace-casing to protect the casing and prevent the current from shunting through it by flowing a cooling medium along the outer face of said casing from the hotter to the cooler portions of the furnace, as set forth.

8. The process of producing calcium carbid, which consists in charging a mixture of a calcium compound and carbon into an electric furnace having a casing of electrically-conductive material, electrically heating the charge to the required temperature, and cooling those portions of the charge adjacent to the inner face of the furnace-casing to an extent sufficient to prevent any substantial shunting of the electric current through the casing, as set forth.

9. The process of producing calcium carbid, which consists in charging a mixture of a calcium compound and carbon into an electric furnace having a casing of electrically-conductive material, electrically heating the charge to the required temperature and bringing the carbid into a molten condition, cooling those portions of the charge adjacent to the inner face of the furnace-casing to an extent sufficient to prevent any substantial shunting of the electric current through the casing, and withdrawing the carbid and supplying additional materials as required, as set forth.

10. The process of producing calcium carbid, which consists in charging a mixture of a calcium compound and carbon into an electric furnace having a casing of electrically-conductive material, passing an electric current through the charge and carbid produced therefrom, acting as a resistance-conductor, and thereby heating the charge to the required temperature, and decreasing the conductivity of those portions of the charge and carbid adjacent to the inner face of the furnace-casing, to protect the casing and prevent the current from shunting through it, by applying a cooling medium to the outer face of said casing, as set forth.

11. The process of producing calcium carbid, which consists in charging a mixture of a calcium compound and carbon into an electric furnace having a casing of electrically-conductive material, passing an electric current through the charge and carbid produced therefrom, acting as a resistance-conductor, and thereby heating the charge to the required temperature, and decreasing the conductivity of those portions of the charge and carbid adjacent to the inner face of the furnace-casing, to protect the casing and prevent the current from shunting through it, by flowing a cooling medium along the outer face of said casing from the hotter to the cooler portions of the furnace, as set forth.

12. The process of producing calcium carbid, which consists in charging a mixture of a calcium compound and carbon into an electric furnace having a casing of electrically-conductive material, passing through the charge and the carbid produced therefrom an electric current the density of which increases along the path of the current, thereby heating the charge to the required temperature and bringing the carbid into a molten condition, and decreasing the conductivity of those portions of the charge and carbid adjacent to the inner face of the furnace-casing, to protect the casing and prevent the current from shunting through it, by applying a cooling medium to the outer face of said casing, as set forth.

13. The process of producing calcium carbid, which consists in charging a mixture of a calcium compound and carbon into an electric furnace having a casing of electrically-conductive material, passing through the charge and the carbid produced therefrom an electric current the density of which increases along the path of the current, thereby heating the charge to the required temperature and bringing the carbid into a molten condition, decreasing the conductivity of those portions of the charge and carbid adjacent to the inner face of the furnace-casing, to protect the casing and prevent the current from shunting through it, by applying a cooling medium to the outer face of said casing, and withdrawing the carbid and supplying additional materials as required, as set forth.

14. The process of producing calcium carbid, which consists in charging a mixture of a calcium compound and carbon into an electric furnace having a casing of electrically-conductive material, passing through the charge or the carbid produced therefrom an electric current the density of which increases along the path of the current, thereby heating the charge to the required temperature and bringing the carbid into a molten condition, and decreasing the conductivity of those portions of the charge and carbid adjacent to the inner face of the furnace-casing, to protect the casing and prevent the current from shunting through it, by flowing a cooling medium along the outer face of said casing from the hotter to the cooler portions of the furnace, as set forth.

In testimony whereof I affix my signature in presence of two witnesses.

ALFRED H. COWLES.

Witnesses:
BENJAMIN E. NORGATE,
F. J. DAVIS.